United States Patent [19]

Martin

[11] 4,278,203
[45] Jul. 14, 1981

[54] ANTISKID TRACTION DEVICE FOR VEHICLE WHEEL

[76] Inventor: Real Martin, 1206 Saint-Louis, Thetford Mines, Quebec, Canada, G6G 4C6

[21] Appl. No.: 14,996

[22] Filed: Feb. 26, 1979

[51] Int. Cl.³ ............................................. E01B 23/00
[52] U.S. Cl. ...................................................... 238/14
[58] Field of Search ............. 238/14; 152/208, 213 R, 152/213 A

[56] References Cited

U.S. PATENT DOCUMENTS

| | | | |
|---|---|---|---|
| 1,075,377 | 10/1913 | Phillips | 238/14 |
| 1,863,316 | 6/1932 | Webster, Jr. | 238/14 |
| 2,443,319 | 6/1948 | Mack | 238/14 |
| 3,786,989 | 1/1974 | Haynes | 238/14 |
| 3,910,491 | 10/1975 | Ducharme | 238/14 |
| 4,210,280 | 7/1980 | Reisner | 238/14 |
| 4,230,269 | 10/1980 | Uchanski | 238/14 |

Primary Examiner—Randolph A. Reese

[57] ABSTRACT

An antiskid traction device of the type which is engaged under a vehicle wheel to provide traction thereto when stuck in a rut. This traction device is characterized by being constructed to prevent sinking thereof into the snow or mud under the wheel, and to prevent throwing thereof by the wheel. This traction device comprises sections articulated one to another end to end, including a resilient tongue section adapted to act as a runner or ski under the vehicle wheel, by an intermediate section or portion engaging in the rut to provide traction therein, and by a traction section formed of expanded metal made wider than the tire to bear on the opposite sides of the rut thus minimizing sinking of the traction device. The expanded metal has nodal points selectively bent upward and downward to produce traction projections and wheel guide projections at the top and cleats at the bottom.

8 Claims, 11 Drawing Figures

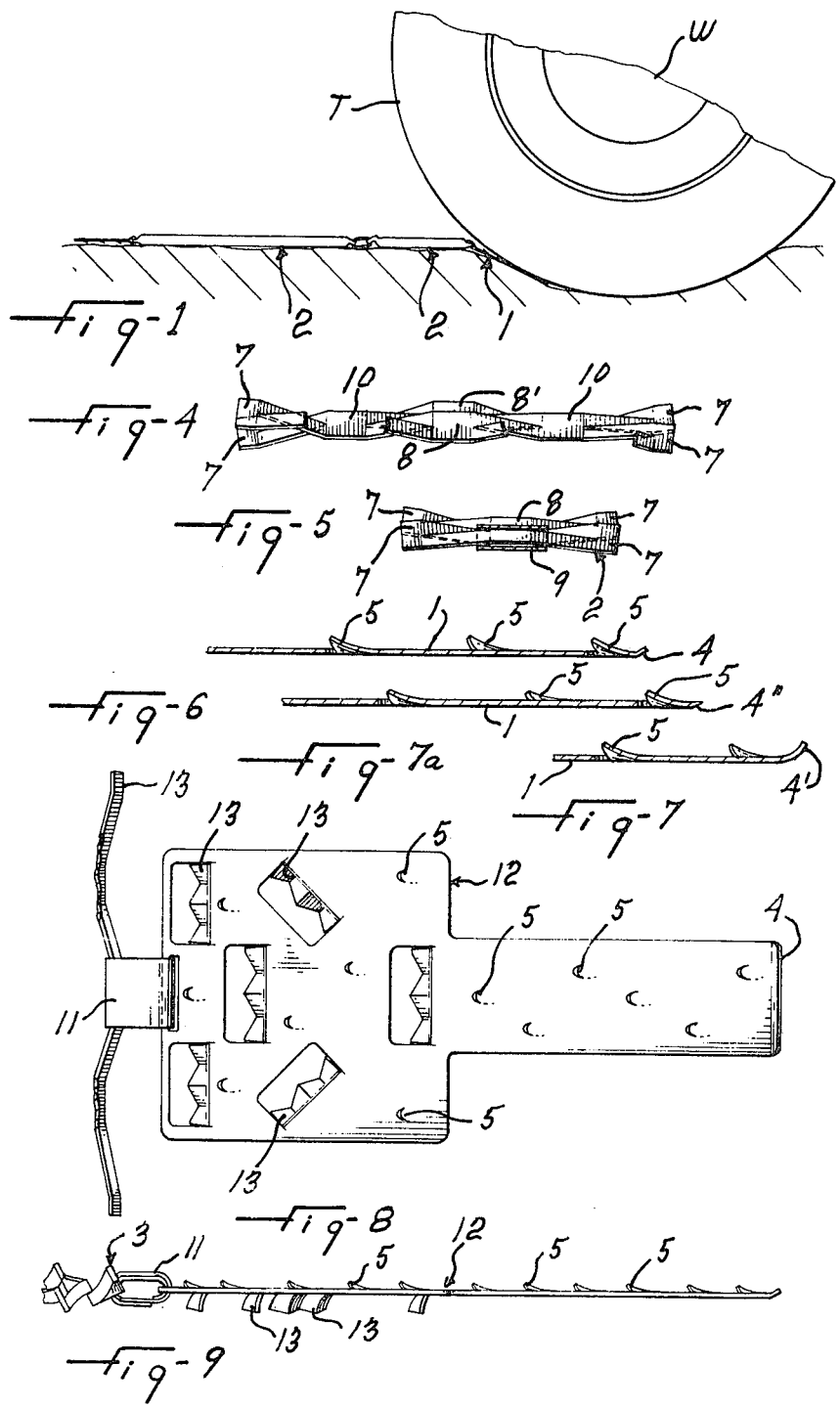

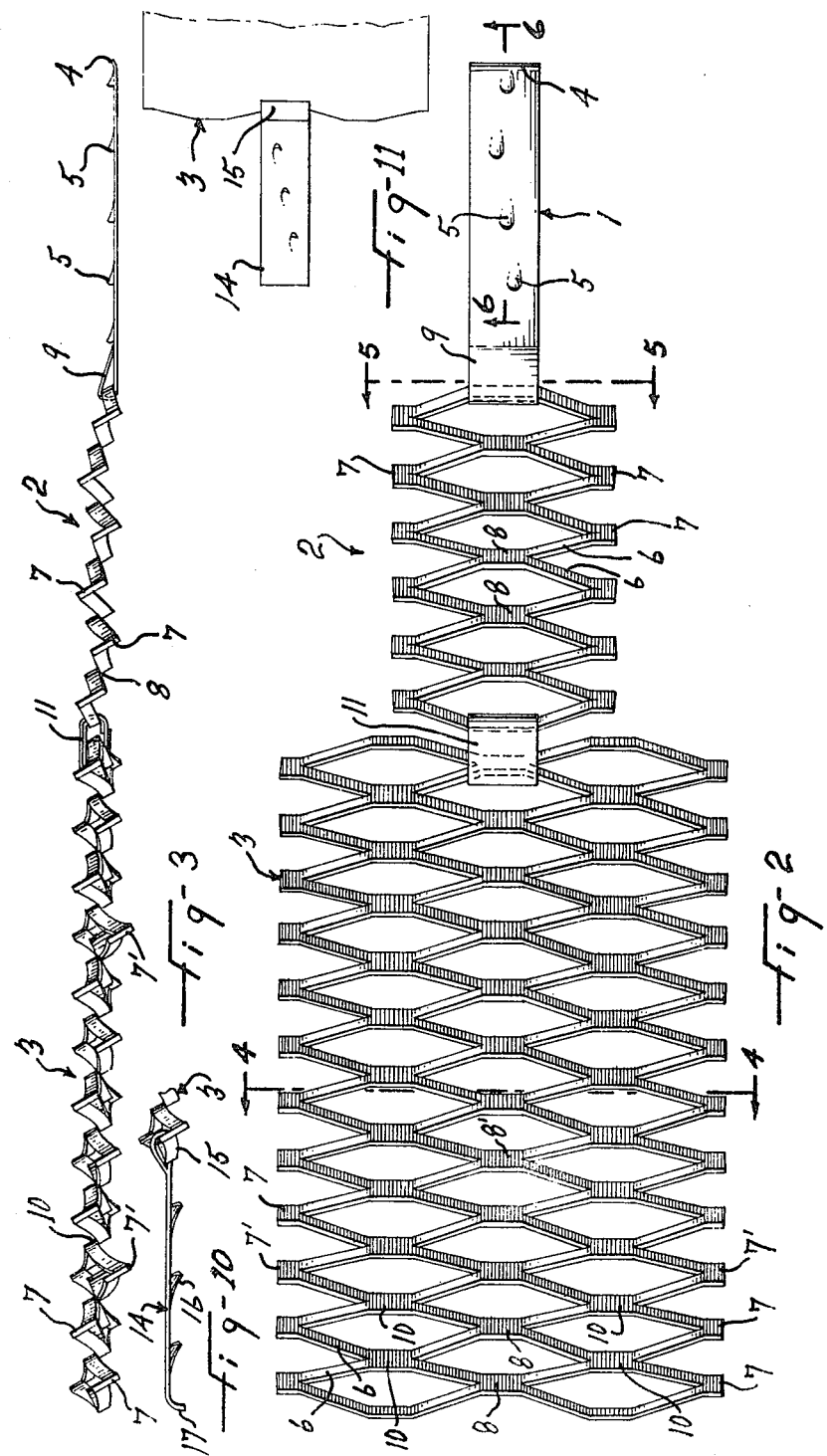

ANTISKID TRACTION DEVICE FOR VEHICLE WHEEL

This invention relates to a traction device of the type which is engaged under a traction wheel of a vehicle to provide traction to the wheel.

The traction devices of the above type which have been proposed so far are made of either a sole rigid body or of rigid sections articulated end to end. In any case, the rigidity of such traction devices and other construction features give them some disadvantages. In particular, such traction devices which have been proposed so far are prone to sink relatively deep into the snow or mud upon passage and action of the vehicle wheel thereon. This is due for instance to its construction, to the inclined position of engagement with the tire, and to the width thereof. Such traction devices of the rigid type are also prone to be thrown by the wheel and thus puncturing the gas tank if it does not sink as aforementioned, to damage the tire, and to laterally shift and thus lose most if not all of its efficiency. Besides, such prior art traction devices are not particularly adapted to grip the surface and provide drag against throwing thereof by the wheel in particular on ice.

It is a general object of the present invention to provide an improved traction device of the above type.

It is another general object of the present invention to provide an antiskid traction device which is relatively not subject to sinking into the snow or mud nor to being thrown by the vehicle wheel.

It is a further general object of the present invention to provide an antiskid traction device which is easy to operatively engage agaist the tire of a wheel and which is adapted to slide like a runner or ski under the wheel to facilitate gripping of the wheel with the device when the wheel starts to rotate.

It is another general object of the present invention to provide a traction device which is made of sections articulated one to another end to end and including a resilient section to engage under the vehicle wheel and operatively curve circumferentially around the tire of the wheel and thus enhance sliding thereof like a runner or ski under the wheel.

It is still another object of the present invention to provide a traction device which is particularly adapted to produce drag or to grip the supporting surface and thus reduce the possibility of the traction device being dangerously thrown by the vehicle wheel.

It is a further object of the present invention to provide a traction device with outer lateral rows of upward projections to laterally guide the device and oppose lateral shifting thereof from under the vehicle wheel.

The above and other objects and advantages of the present invention will be better understood with reference to the following detailed description of preferred embodiments thereof which are illustrated, by way of examples, in the accompanying drawings; in which:

FIG. 1 is a side view of a vehicle wheel and an antiskid traction device according to the present invention in operative position relative to the wheel;

FIG. 2 is a plan view of an antiskid traction device according to a first embodiment of the present invention;

FIG. 3 is a side elevation view as seen from the bottom in FIG. 2;

FIGS. 4, 5 and 6 are cross-sectional views as seen along lines 4—4, 5—5 and 6—6 respectively in FIG. 2;

FIGS. 7 and 7a are longitudinal sections of two other embodiments of the tongue section of the antiskid traction device of FIG. 2;

FIGS. 8 and 9 are a plan view and an elevation view respectively of a portion of an antiskid traction device according to a second embodiment of the invention; and FIGS. 10 and 11 are an elevation view and a plan view respectively of a drag section which may be added to any embodiment of the present invention.

The antiskid traction device of FIGS. 1 to 6 inclusive comprises a tongue section 1, an intermediate antiskid traction section 2, and a wider antiskid traction section 3.

The tongue section 1 is made of a strip of spring steel which is flat transversely and longitudinally but which will resiliently flex circumferentially around the ordinary tire T of a vehicle wheel W. The tongue section 1 has the longitudinal shape of a runner or ski including an upwardly bent outer end 4. The tongue section is punched to form upward projections 5 which are inwardly directed to provide grip for the tire T such that the rotation of the wheel will make the tongue section 1 to slide under it drawing the remainder of the traction device with it. The tongue section 1 is substantially narrower than the ordinary vehicle tire to slide easily under it when manually pushed. Outer end 4, because it is upwardly bent, prevents tongue section 1 from being stuck into the snow or ice when manually pushed. The outer end of section 1 can be made higher as shown at 4' in FIG. 7 to also provide a tire grip as projections 5. Said outer end can be simply bevelled as shown at 4" in FIG. 7a.

The intermediate antiskid traction section 2 comprises a strip of expanded metal having a width slightly less than the width of an ordinary tire T to engage in the rut under the wheel. The intermediate antiskid traction section 2 is expanded longitudinally of the sections 1, 2 and 3 and defines filaments 6 interconnected by three longitudinal rows of nodal points 7 and 8. The nodal points 7 of laterally opposite outer rows of nodal points are alternatively raised upward and downward with respect to the plane containing central nodal points 8, respectively forming upward projections to provide traction to the wheel and downward projections to provide traction in the snow or on ice. The inner end 9 of the tongue section 1 is looped around one filament of section 2 to form an articulation between these two sections.

The wider antiskid traction section 3 is also made of expanded metal and has a width exceeding the width of the vehicle wheel such that the opposite lateral edges will bear on the opposite sides of the rut to minimize sinking of the whole device into the snow under the vehicle wheel. The section 3 is expanded longitudinally of the sections 1, 2 and 3 and defines filaments 6 interconnected by five longitudinal rows of nodal points 7, 8 and 10. The laterally opposite outer rows of nodal points 7 in section 3 are alternatively raised upward and downward with respect to the two rows of nodal points 10 which are all at substantially the same level. Preferably some nodal points 7, as indicated at 7', are bent down further to provide better snow grip when the vehicle weight is smaller. Most nodal points 8 of the central row in section 3 lie in the plane of nodal points 10 but some of them are raised forming longitudinally spaced upward projections 8' to provide better traction to the wheel, as shown in FIG. 4. A metal clip 11 is clamped around one filament 6 at the other end of the section 2 and the last nodal point 8 at one end of the section 3 to hinge the two sections 2 and 3 one to the other. Thus, the antiskid traction device may be conveniently transported in compact position with the sections 1, 2 and 3 folded back one over another such as for instance to use less space in the trunk of an automobile. Clip 11 is preferably formed of a non-resilient metal strip wound on itself at least one turn and a half and then flattened as shown in FIG. 3, thereby avoiding welding of the ends of the strip.

In FIGS. 8 and 9, there is shown an embodiment wherein the intermediate section 2 and tongue section 1 are replaced by a resilient, preferably spring steel, tongue section 12 having a narrower portion integrally formed with a wider portion. The narrower portion of the tongue section 12 is made exactly like the aforedescribed tongue section 1 including the elements 4 and 5. Element 4 can be replaced by element 4' or 4". The wider portion of the tongue section 12 constitutes an enlargement at the inner end of the narrower portion and includes downwardly punched out elements 13 forming cleats to grip in the snow, ice, mud or the like. The wider portion also includes upwardly punched out projections 5 to provide grip for the tire T of the vehicle wheel.

A metal clip 11 clamps the outer end of the wider portion of section 12 to the last nodal point 8 at one end of the section 3 to provide articulation between the two sections.

A drag or anchor section 14, as shown in FIGS. 10 and 11, is pivotally attached by a bent portion 15 to the outer end of the section 3, is punched out to form downward projections 16, and is downwardly bent at its trailing end 17 to grip into the snow, ice or mud and thus produce a sufficient drag to prevent throwing of the antiskid traction device by the rotating vehicle wheel W when the latter is about to move away from the device.

What I claim is:

1. An antiskid traction device for a vehicle wheel tire comprising first and second elongated, antiskid traction sections articulated end to end, and a tongue section protruding from the outer end of said second antiskid traction section, said three sections having a common longitudinal axis, said first and second antiskid traction sections having gripping means protruding from both main faces thereof, said first antiskid traction section being relatively wider than said tire, said second antiskid section having a width nearly equal to, but smaller than, the width of said tire and intermediate the width of said tongue section and of said first antiskid traction section, and interposed between the latter and said tongue section, said tongue section being a strip which is resilient, thin and flat both longitudinally and transversely, which is substantially narrower than said tire, has upward projections punched out therein for tractive engagement of said tire thereon, and being without projections at its underside, said tongue section having an upwardly-inclined leading edge and forms a runner element which can be slid under said tire, said tongue section longitudinally taking the circumferentially curved shape of said tire and, when released, resiliently springing back to its longitudinally flat shape.

2. An antiskid traction device as defined in claim 1, wherein said first antiskid traction section is made of expanded metal with the expansion thereof made longitudinally of said section and defines filaments and nodal points interconnecting said filaments and forming up-and-down projections on the opposite faces of the first antiskid traction section, said projections constituting said gripping means.

3. An antiskid traction device as defined in claim 2, wherein said nodal points include a pair of laterally opposite outer rows of nodal points and at least one laterally intermediate row of nodal points, and the nodal points in each of said laterally opposite rows project alternatively up and down along the corresponding rows defining downwardly projecting traction cleats and upwardly projecting lateral wheel guides operatively guiding the antiskid traction device laterally upon engagement with the vehicle wheel.

4. An antiskid traction device as defined in claim 3, wherein the nodal points along said intermediate row alternatively project upwardly and form tractive projections operatively engaging the tire.

5. An antiskid traction device as defined in claim 4, wherein said nodal points comprise three laterally intermediate rows of nodal points including said one intermediate row and two other rows on opposite sides respectively of said one intermediate row.

6. An antiskid traction device as defined in claim 1, 2 or 5, further including a drag section articulated end to end to the free end of said first antiskid traction section and having downward projections operatively gripping in the supporting surface upon pulling action thereon by engagement of the vehicle wheel on said drag section.

7. An antiskid traction device as defined in claim 1, 2 or 5, wherein said second antiskid section is made of expanded metal with the expansion thereof made longitudinally of said second section and defines filaments and nodal points interconnecting said filaments and including a pair of laterally opposite outer rows of nodal points and one laterally intermediate row of nodal points, and the nodal points in each of the laterally opposite rows of said second antiskid traction section project alternatively up and down along the corresponding rows defining downwardly projecting traction cleats and upwardly projecting tractive projections operatively engaging the tire.

8. An antiskid traction device as defined in claim 1, 2 or 5, wherein said second anti-skid traction section is integrally formed with said tongue section, and has punched-out projections operatively projecting up and down therefrom and constituting said gripping means.

* * * * *